United States Patent [19]

Suzuki

[11] 4,071,127

[45] Jan. 31, 1978

[54] METHOD OF WORKING FOR BENDING METAL MATERIAL AND THEREBY OBTAINED FRICTION CORE PLATE OF FRICTION CLUTCH

[76] Inventor: Hiroichi Suzuki, 1232 Kakezuka, Ryuyo, Iwata, Shizuoka, Japan

[21] Appl. No.: 655,191

[22] Filed: Feb. 4, 1976

[30] Foreign Application Priority Data

Feb. 6, 1975 Japan .................................. 50-14876

[51] Int. Cl.² ............................................. B21D 53/26
[52] U.S. Cl. .................................. 192/107 R; 72/359; 72/379; 192/70.2
[58] Field of Search ................. 72/359, 376, 379, 380, 72/381, 384, 385; 113/116 D; 192/106.1, 106.2, 107 C, 107 R, 70.2; 29/159 R, 159.1

[56] References Cited

U.S. PATENT DOCUMENTS

| | | | |
|---|---|---|---|
| 1,142,782 | 6/1915 | Carlson | 72/359 |
| 1,403,642 | 1/1922 | Sauvage et al. | 72/399 |
| 2,114,247 | 4/1938 | Davis | 192/106.1 |
| 2,591,108 | 4/1952 | Vigneault et al. | 72/336 |
| 2,636,253 | 4/1953 | Rees | 72/359 |
| 3,218,828 | 11/1965 | Thelander | 192/106.1 |

*Primary Examiner*—Lowell A. Larson
*Attorney, Agent, or Firm*—Cullen, Settle, Sloman & Cantor

[57] ABSTRACT

When a metal piece is forced to undergo a 180° bend with a press, in order that the outer end face of the bent portion be square rather than rounded, the portion to be bent is put in a die and buckled toward the folding line while bending is effected. Also a number of T-shaped projections radially extending from the outer periphery of an annular iron plate are formed with the lug portions of such projections bent so that the outer ends of the bent portions are formed flat.

3 Claims, 13 Drawing Figures

U.S. Patent   Jan. 31, 1978   4,071,127
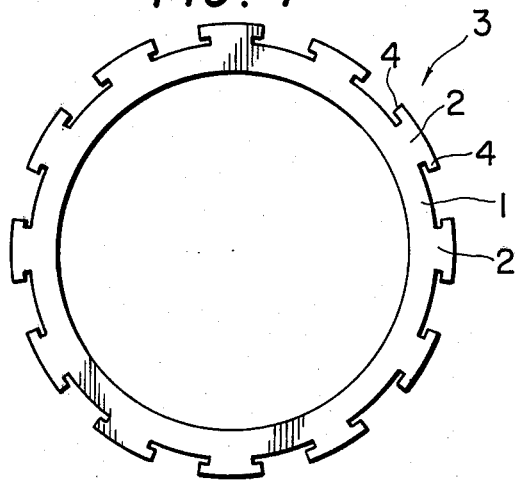
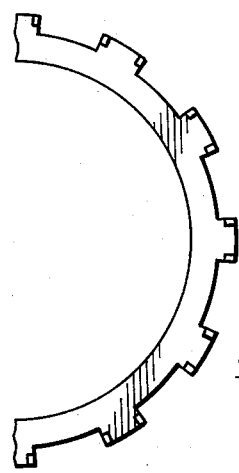
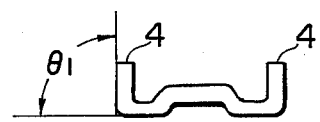
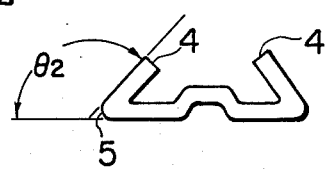
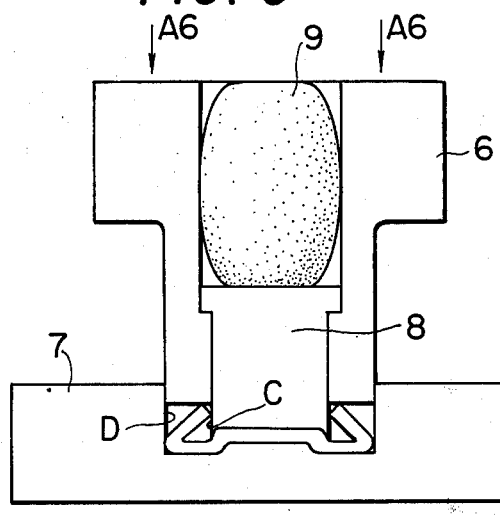
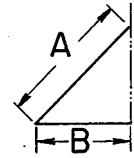
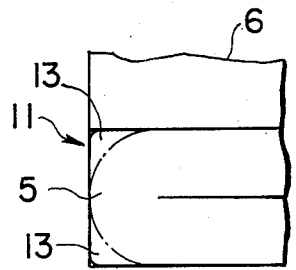
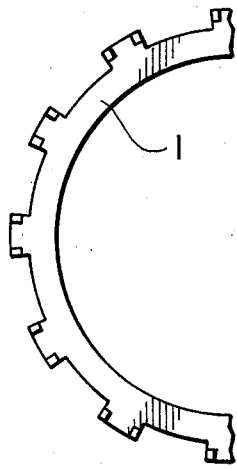
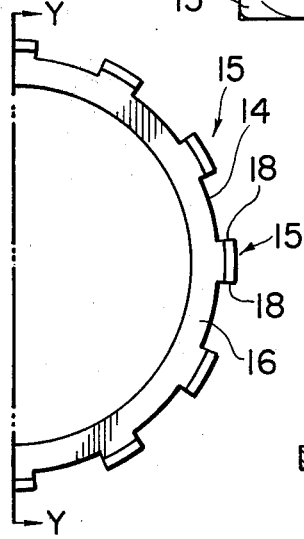
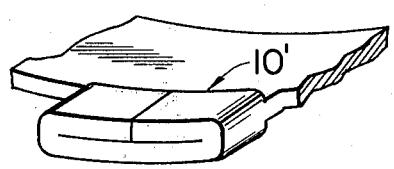
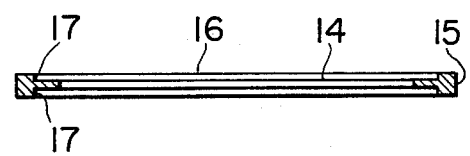

METHOD OF WORKING FOR BENDING METAL MATERIAL AND THEREBY OBTAINED FRICTION CORE PLATE OF FRICTION CLUTCH

BACKGROUND OF THE INVENTION

This invention relates to an improvement in a method of working for bending a metal material, such as iron plate or the like.

More particularly, this invention relates to the method of working for bending metal so that the bent portion is prevented from being rounded and is made substantially in rectangular shape.

Conventionally when a plate metal undergoes a 180° bend, that is to two halves folded together, the folded edge becomes round and it was difficult to make it rectangular. When the metal piece undergoes a 180° bend, that is folded to two halves close to each other, in such instance if the outer face of its bent portion is made to be rectangular so that its outer end is flat, this will have a better quality than that of the round end. That is, such flat portion will stand up against greater pressure and be wearproof. Therefore making of such flat end will be utilized in many situations matters.

BRIEF DESCRIPTION OF THE INVENTION

The object of the present invention is to provide a method, when a metal piece is bent, to make its edge substantially in rectangular shape viewing from the sides.

Conventionally the core plate of a clutch to be used as a friction plate (hereinafter referred to merely as core plate), was difficult to make from an iron plate by press and therefore it was made using aluminium by means of die-cast. Such core plate made by conventional methods was an annular aluminium plate with a number of projections extending from its outer edge. However its annular portion and a part of each projection were made somewhat thin for attaching friction members over its sides, that is made with a stepped portion. Said projections are slide contact portions to be slidingly held in the groove of the clutch housing.

Since such core plate had to have a stepped portion in either side, it was difficult to make it from merely a metal plate and therefore it was made by die-casting.

However, such method with die-casting as above required a very troublesome process as melting of aluminium, casting, cooling and finishing. Also because made of aluminium, the life of the contact portion was not long. Further because of its less rigidity, the core plate had to be made thick. This prevented compactness of clutches.

Other object of the present invention is to solve the aforesaid problems in the conventional core plates and to provide an improved method of working metal bending in manufacturing a core plate from an iron plate by means of press.

The method of working metal bending to achieve said objects is that firstly a piece of metal to be folded is bent along the folding line to an acute angle and then this portion is placed in a die whose inside wall is constructed to have a right-angle and its clearance length is shorter than the length of said portion to be bent, and to press it in a direction at right angles to the length of the folded piece. Also from a blank iron plate is punched a body 3 having a number of equally spaced T-shape projections 2 radially extending from its annulus 1. And lug portions 4.4 of said T-shape projections 2 are bent inwardly. Then such bent portions 5 are forced into the opening of the die whose length is shorter than the length of said portion to be bent and the bent ends are deformed to be substantially square thus to produce a friction core plate.

Other objects and detailed construction of the present invention will be more apparent with reference to accompanying drawings. It will be understood the method of working metal bending of the present invention will be particularly useful for producing a core plate for friction clutches.

THE DRAWING

FIG. 1 is a plan view of the body of core plate punched by a press.

FIG. 2 is a fragmentary plan view of the projections of the body of core plate in FIG. 1 of which lug portions are bent in 90°.

FIG. 3 is a side view of the lug portions in FIG. 2.

FIG. 4 is a side view of the lug portions in FIG. 3 further bent.

FIG. 5 is an explanatory section view of dies for further bending the lug portions shown in FIG. 4.

FIG. 6 is a side view of slide contact portions of core plate formed by working shown in FIG. 5.

FIG. 7 and FIG. 8 are explanatory views of the lug portions being bent.

FIG. 9 is an explanatory view of deformation of the bent portion when a slide contact portion is formed.

FIG. 10 is a plan view of a core plate made by the method of the present invention.

FIG. 11 is a perspective view of the slide contact portion of another embodiment of the present invention.

FIG. 12 is a plan view of a conventional core plate.

FIG. 13 is a section view taken along the line X-Y in FIG. 12.

DETAILED DESCRIPTION

The present description is for a method of working metal bending to produce such core plate.

As the first step, from an iron plate material is produced with punching an iron plate body 3 of an annulus 1 having a number of spacedly apart T-shape projections 2 extending in radial directions from its outer periphery. 4.4 are lug portions of the projection 2.

Then as the second step, a part of the projection 2 is bent with press to have substantially a W-shape cross section as seen in FIG. 2 and FIG. 3. In this instance, the lug portions are bent in the same direction normal to the face of the annulus.

As the third step, said lug portions 4.4 are further bent with a press in a direction to face closely to each other. One example is shown in FIG. 4 in which the bent angle $\theta_2$ is 135°. 5 is a bent portion.

The projection 2 thus bent is then passed to the fourth step with press means as shown in FIG. 5. In FIGS. 5, 6 is an upper die, 7 a lower die, 8 a movable guide and 9 a urethane rubber member.

With the upper die 6 of the press thus constructed, pressure is applied from the above in a direction of arrow A6. Then the lug portions 4.4 of the projection are deformed respectively as shown in FIG. 6. 10 is a slide contact portion formed thereby. 11 is an end of the slide contact portion. 12 is a slide contact face.

The procession of such deformation is such that firstly the bent portion 5 of the lugs 4.4 is locally stretched thereby the plate is slightly thinned. Thus it is bent while press stretching is being effected as shown by dash line of FIG. 7.

As the lug portions 4,4 are pressed downwardly with the upper die 6 while they are pinched between the wall D of the lower die and wall C of the movable guide, the length A of the lug 4 is deformed into the length B as shown in FIG. 8. That is, its length is shortened as an effect of what is called buckling.

In this instance, further downward pressure applied by upper die 6 imparts strong compression to the bent portions 5 of the lug portions 4.4. These have been formed substantially in round shape in cross section FIG. 4 at the end of the third step become deformed ends 13 as shown in FIG. 9. As a result they form slide contact ends 11 of substantially square shape. Thus flat contact faces 12 are obtained. The lug portions 4.4 are thus formed to have the slide contact ends 11 under the process of press stretching, buckling and compression. With cold forging, the slide contact ends 11 have fiberous texture thereby the material quality is greatly improved. FIG. 10 shows a core plate made with such process.

The annular portion 1 in FIG. 10 and the inner portion of dash line in FIG. 6 are portions for providing a friction member.

Another embodiment is shown in FIG. 11. In this, the slide contact portion 10' formed by the press may be made without a friction member.

From the above explanation, it will be understood that irrespective of said core plate, generally when metal is to be bent with the method of the present invention, its feature lies in that bending is effected as the portion to be bent is forced into the space between the wall of the die and the wall of the guide, and the length of the space is shorter than the length of the portion to be bent.

In the method of the present invention, there are no troublesome step such as melting of aluminium, casting, cooling and finishing. It accomplishes in very simple way of only press working and also permits mass production of core plates in very efficiently manner.

Also wear resistance of the slide contact ends of the core plate is remarkably improved. Further since this can be produced thinner than the conventional one, it enables the clutch to be compact in size. Also the material itself is less expensive than the conventional one. Further the iron plate, compared with aluminium material, has greater capacity against torque or twisting force imparted to the annulus of the core plate. Thereby the plate can be made thin and the clutch housing can occupy less space.

With this method, metal in general may be bent with its bent portion to be rectangular so that such bent portion can be used not only as a contact portion of said core plate but also to in many other areas.

The above description is to the method of the present invention. However the invention is not limited to the above. Any change or modification thereto may be made without departing from the spirit of this invention.

What is claimed is:

1. The method of working for metal bending comprising providing a press consisting of a lower die having a bottom wall and therefrom a perpendicular rising side wall and an upper die in slide contact with said side wall and a movable guide having a side wall in slide contact with another side wall of said upper die;
    bending with another press a metal material piece folding it into an acute angle so that the length of the folded portion is larger than the distance between the side wall of said lower die and the side wall of said movable guide;
    placing the folded piece upon the lower die bottom wall;
    placing the folded portion between the side wall of the lower die and the side wall of said movable guide;
    pressing said folded portion in a direction perpendicular to said bottom wall at the same time slide contacting said upper die both with the side wall of said lower die and the side wall of said movable guide buckling the folded portion in the direction of its length so that at the outside of the folded line of said folded portion a flat portion is formed which is perpendicular both to said folded portion and of said folded piece, with said folded portion bearing against and parallel to the folded piece.

2. The method of working for metal bending as claimed in claim 1 characterized in that said metal material is a core plate of a clutch to be used as a friction plate with a number of radial T-shaped projections formed at the periphery of an annular iron plate and a pair of spaced lugs at the tip of each projection.

3. In an annular iron core plate of a clutch to be used as a friction plate having a series of spaced T-shaped projections extending radially from the periphery of said annular plate, each projection having a pair of spaced lugs folded inwardly into face-to-face relation to each other, characterized in that the outside of the folded line of said projection is perpendicular to the folded portion and also perpendicular to the folded piece forming a flat portion and providing spaces between said flat portions of adjacent projections.

* * * * *